US005658656A

United States Patent [19]

Whitney et al.

[11] Patent Number: 5,658,656

[45] Date of Patent: Aug. 19, 1997

[54] USE OF MATERIALS COMPRISING MICROBUBBLES AS ACOUSTICAL BARRIERS

[75] Inventors: Leland R. Whitney, St. Paul; Michael W. Dolezal, Eden Prairie; Ronald W. Gerdes, St. Paul; Gary N. Harvieux, Woodbury; Charles A. Marttila, Shoreview; Joseph G. Mandell, Maplewood; Thomas J. Scanlan, Woodbury, all of Minn.

[73] Assignee: Minnesota Mining and Manufacturing Company, St. Paul, Minn.

[21] Appl. No.: 511,002

[22] Filed: Aug. 3, 1995

Related U.S. Application Data

[63] Continuation of Ser. No. 819,275, Jan. 10, 1992, abandoned.

[51] Int. Cl.$^6$ .................. B32B 3/26; E04B 1/82

[52] U.S. Cl. .................. 428/304.4; 181/198; 181/212; 181/264; 181/286; 181/288; 428/307.3; 428/308.4; 428/312.2; 428/315.5; 428/406; 428/411.1

[58] Field of Search .................. 181/198, 200, 181/212, 264, 286, 288, 294; 52/144, 145; 55/276; 428/304.4, 307.3, 308.4, 312.2, 314.4, 315.5, 406, 411.1

[56] References Cited

U.S. PATENT DOCUMENTS

| | | | |
|---|---|---|---|
| 2,720,276 | 10/1955 | Droeger | 181/203 |
| 2,806,509 | 9/1957 | Bozzacco et al. | 154/28 |
| 2,985,411 | 5/1961 | Madden, Jr. | 244/123 |
| 3,132,956 | 5/1964 | Lewis | 86/71 |
| 3,608,010 | 9/1971 | Stayner | 264/51 |
| 3,898,063 | 8/1975 | Gazan | 55/276 |
| 3,989,534 | 11/1976 | Plunguian et al. | 106/86 |
| 4,079,162 | 3/1978 | Metzger | 428/312 |
| 4,146,112 | 3/1979 | Usry | 181/202 |
| 4,238,641 | 12/1980 | Planting et al. | 174/88 |
| 4,463,049 | 7/1984 | Kracke et al. | 428/281 |
| 4,465,159 | 8/1984 | Stallings | 181/129 |
| 4,528,305 | 7/1985 | Henry | 523/219 |
| 4,528,652 | 7/1985 | Horner et al. | 367/162 |
| 4,548,863 | 10/1985 | Hicks et al. | 428/325 |
| 4,788,230 | 11/1988 | Mudge | 523/219 |
| 4,816,618 | 3/1989 | Bongianni | 174/102 B |
| 5,187,461 | 2/1993 | Brommer et al. | 333/219.1 |
| 5,504,281 | 4/1996 | Whitney et al. | 181/286 |

FOREIGN PATENT DOCUMENTS

| | | | |
|---|---|---|---|
| 2649356 | 1/1991 | France | B29C 67/20 |

OTHER PUBLICATIONS

"Scotchcast™ Electrical Resins", 3M Electrical Specialties Division, 1990.

"Measurement and Calculation of Acoustic Propagation Constants in Arrays Air–Filled Rectangular Tubes", Heui–Siol Roh, W. Patrick Arnott, and James M. Sabatier, *Journal of the Acoustical Society of America,* vol. 89 (6), Jun. 1991.

*Primary Examiner*—Patrick Ryan
*Assistant Examiner*—Marie R. Yamnitzky
*Attorney, Agent, or Firm*—Gary L. Griswold; Walter N. Kirn; Janice L. Dowdall

[57] ABSTRACT

A method of using a material as an acoustical barrier in an ambient medium. The material comprises microbubbles having average outer diameters of 5 to 150 microns, bound together at their contact points. The material is characterized by either a porosity of 20 to 60 percent, or by voids between the microbubbles which have characteristic diameter within an order of magnitude of the viscous skin depth of the ambient medium, as calculated at 1 kHz; an air flow resistivity of $0.5\times10^4$ to $4\times10^7$ mks rayls/meter, and an attenuation of sound comparable to mass law performance. The microbubbles can be sintered into direct contact with each other, or one of many types of binder material can be used to support the microbubbles within a composite material. The method may be practiced in an acoustical system comprising a sound source and the material, such as by placing a muffler comprising the material substantially in a direct path of a fluid; and also in applications requiring high specific stiffness and flexural strength.

19 Claims, 3 Drawing Sheets

USE OF MATERIALS COMPRISING MICROBUBBLES AS ACOUSTICAL BARRIERS

This is continuation of application No. 07/819,275, filed Jan. 10, 1992, (now abandoned).

STATEMENT OF GOVERNMENT SUPPORT

This invention was developed with Federal Government support under contract number IE2595-445-RES89. The Federal Government has certain rights in this invention.

TECHNICAL FIELD

This invention involves methods of attenuating sound which use acoustical barrier materials, and acoustical systems which incorporate such materials.

BACKGROUND

To reduce sound pressure levels in an enclosed space in which a sound source is present, one approach is to cover all exposed hard surfaces with a soft, non-reflecting sound absorbing material such as a compressible open cell foam. A common misunderstanding is that such sound absorbing materials also are good acoustical barrier materials. But, acoustical barrier materials have the opposite property from acoustical absorbing materials, i.e., barriers are highly reflective to sound, and do not absorb it.

Similarly, although some materials are used as acoustical barrier materials and also as acoustical dampening materials, the function of a barrier material differs significantly from the function of a dampening material. In order for a material to provide efficient viscous dampening to a composite panel, it must be adhered or coupled to the panel. The same material provides better performance as a barrier when it it isolated or decoupled from the panel.

Thus, a noisy piece of office equipment within a room could be enclosed within a barrier. But, it would be ineffective to leave the office equipment exposed within the room and line the room with acoustical barrier, as the noise will be reflected back to the inhabitants of the room. A better approach would be to line the room with acoustical absorber material, e.g., acoustical ceiling tiles, carpeted floors and absorbing materials mounted on the walls. By contrast, a meeting room adjacent a noisy factory could be lined with acoustical barrier material to prevent the factory noise from entering the room.

The differences in performance can be explained by considering the operation of each type of material. The essential physical characteristic of an acoustical absorber is controlled porosity. The process of absorption depends on sound entering the material where it is converted to heat by friction on the porous surface and cells of the material. Since sound waves must flow through the absorbing material, the effectiveness of the absorbing material as an acoustical barrier is very limited.

Thus, the prior art teaches that acoustical barrier materials should be non-porous, massive and limp in order to be effective. Acoustical barriers are ineffective when they are placed over an area which is not a significant noise source or path. In order to provide a noticable improvement (3 dB reduction in sound level), the treated area must be the source or path of half the acoustical energy of the targeted noise.

If design limitations require holes to be cut into an acoustical barrier material, the effectiveness of the acoustical design is reduced significantly. However, such holes are usually necessary for structural supports, electrical wiring, control cabling, and the like that support a piece of equipment representing a noise source.

Furthermore, acoustical barrier materials can be ineffective in controlling structural borne noise, which readily propagates through any portion of a structure due to the typical high density of structural materials.

To increase the transmission loss of an acoustical barrier material, the prior art teaches to increase the mass per unit area of the barrier, and to use a limp material, i.e., a material which is not so rigid that it will shake or vibrate in a sound field, thus transmitting vibration and regenerating sound on the other side of the barrier.

For a composite barrier system, the prior art teaches multiple massive layers, layers of highly absorbing material (e.g., a limp material such as glass-based thermal insulation) between layers of barrier materials, and air gaps between layers of barrier material.

The techniques are often combined. Each technique, however, has disadvantages at low frequencies (0.1–1.0 kHz). To achieve large acoustical loss at 0.1 kHz by adding mass alone, the barrier weight per unit area would have to be more than about 4800 N/m$^2$. Thus, a dense material such as lead is suggested, and limp lead sheeting is often used to prevent resonances. However, limp thermal insulation and air gaps, while lower in weight than dense materials such as lead, provide only excellent high frequency (5.0–10.0 kHz) transmission loss, but are marginally effective at low frequencies.

U.S. Pat. No. 4,079,162, issued Mar. 14, 1978, discloses a composite material comprising hollow glass microspheres interspersed into a curable resin base. The microspheres support vacua within themselves. The cured resin is flexible, relatively soft and has a relatively low indentation hardness.

French Patent Application No. 8908982, published Jan. 11, 1991 as publication No. 2649356, discloses a composite honeycomb material comprising roughly bonded hollow microspheres and a solid binder forming menisci in contact zones located between the microspheres. The menisci insure mutual bonding among the microspheres while leaving the rest of the interstitial volume between the microspheres as void.

SUMMARY OF THE INVENTION

The invention is a method of using a material as an acoustical barrier in an ambient medium. The material used comprises hollow microbubbles having average outer diameters of 5 to 150 micron, bound together at their contact points to form voids between themselves. The acoustical barrier material has an air flow resistivity of $0.5\times10^4$ to $4\times10^7$ mks rayl/meter, and an attenuation of sound comparable to mass law performance. Since air flow resistivity depends independently on the porosity of the material and the void volumes, the acoustical barrier material can be characterized by either a porosity of from 20 to 60 percent; or a void characteristic diameter within an order of magnitude of the viscous skin depth of the ambient medium.

Other aspects of the invention are an acoustical system comprising a sound source and the acoustical barrier material. The sound source may be within an enclosure comprising the acoustical barrier material, or outside of such an enclosure, such as would occur when the enclosure substantially encloses a human ear.

A preferred acoustical system uses the acoustical barrier material as a muffler. In this case, the porosity of the material means that the muffler will allow the ambient medium to pass, but attenuate sound.

Another aspect of the invention is the use of the material in applications requiring both high specific stiffness, and high flexural strength relative to the density of the material. In these applications, practice of the invention achieves the dual goals of structural stability and acoustical barrier performance through the use of only a single material.

DETAILED DESCRIPTION

Acoustical Barrier Material

Figure 1:
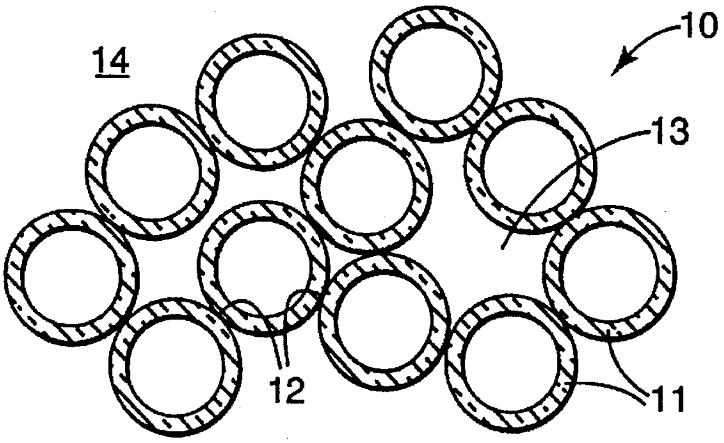
FIG. 1 is an expanded cross-sectional view of a portion of acoustical barrier material used in the invention.

As shown in FIG. 1, the acoustical barrier material 10 used in the invention comprises a plurality of lightweight microbubbles 11, bound together at their contact points 12 by any convenient method.

The acoustical barrier operates within an ambient medium 14. Typically the ambient medium comprises air, but it can comprise other gases, such as hydrocarbon exhaust gases from a gasoline or diesel engine, some mixture of air and hydrocarbon exhaust gases.

The preferred microbubbles 11 are made from a ceramic or polymeric material. An average outer diameter in the range of 5 to 150 microns is suitable. Preferred microbubbles may have a wall thickness (difference between inner and outer average radii) of 1–2 microns. The preferred microbubbles have average outer diameters of approximately 70 microns, and in these preferred microbubbles the wall thickness is not critical if it is less than the outer diameter by at least an order of magnitude.

The hollow microbubbles 11 form between themselves voids 13 which have a characteristic void diameter, which may be measured by known mercury intrusion techniques. Results of such tests on the materials used in the practice of the invention indicate that a characteristic void diameter of about 25 to 35 microns is preferred for applications in air.

We believe that this range of values provides preferred acoustical performance because the characteristic void diameter approximates the viscous skin depth of the ambient medium 14 (which depends only on the viscosity and density of the medium, and the incident frequency of the sound). For example, the viscous skin depth of air varies from 200 micron at 0.1 kHz to 70 micron at 1 kHz to 20 micron at 10 kHz.

Thus, the acoustical barrier material may be characterized by a characteristic void diameter within an order of magnitude of the viscous skin depth of the ambient medium; an air flow resistivity of $0.5\times10^4$ to $4\times10^7$ mks rayls/meter, preferably $7\times10^5$ mks rayl/meter; and an attenuation of sound by the material comparable to mass law performance.

Alternatively, and independently, the acoustical barrier material may be characterized by a porosity of 20 to 60 percent, preferably 40 percent (in determining porosity, the hollow microspheres are assumed to be solid particles); an air flow resistivity of $0.5\times10^4$ to $4\times10^7$ mks rayls/meter, preferably $7\times10^5$ mks rayl/meter; and an attenuation of sound by the material comparable to mass law performance.

For this invention, an attenuation of sound is "comparable to mass law performance" when it is not less than 10 dBA below the theoretical performance predicted by either the field incident or normal incident mass law, over substantially all of a frequency range of 0.1 to 10 kHz, other than coincidence frequencies.

For example, the normal incident mass law predicts that the transmission loss, in decibels, is $$20 \log (\omega m/2\rho c)$$

where

ω is the (angular) frequency of the incident sound, m is the mass per unit area of the acoustical barrier, ρis the density of the ambient medium c is the speed of sound in the ambient medium.

Coincidence frequencies are those regions of the acoustical spectrum where the acoustical barrier is mechanically resonating such that the acoustical impedence of the barrier as a whole is equal to that of the ambient medium, i.e., perfect transmission will occur for waves incident at certain angles. Such frequencies are determined only by the thickness and mechanical properties of the acoustical barrier.

Glass microbubbles are the most preferred lightweight microbubbles 11, especially those identified by Minnesota Mining and Manufacturing Company as "SCOTCHLITE" brand glass microbubbles, type C15/250. These microbubbles have density of about 0.15 g/cc. Screening techniques to reduce the size distribution and density of these microbubbles are not required, as they have only minimal effect on acoustical performance (in accordance with mass law predictions).

Figure 2:
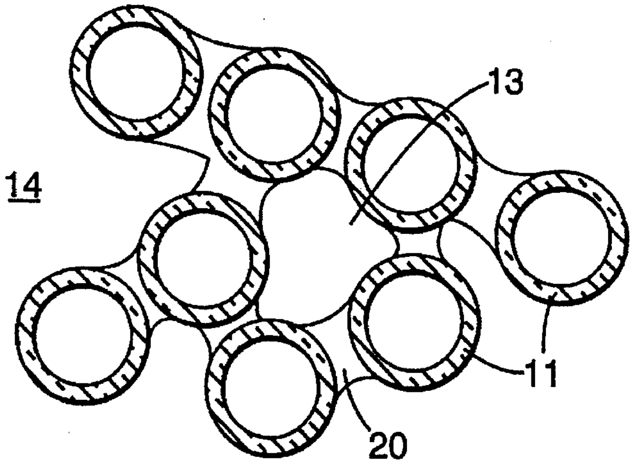
FIG. 2 is an expanded cross-sectional view of a portion of another embodiment acoustical barrier material used in the invention.

As shown in FIG. 2, an alternative to sintering is binding together the microbubbles 11 at their contact points 12 with a separate material 20, known as a binder, but not so much binder 20 as would eliminate voids 13. Typically this may be done by mixing the microbubbles 11 with resin of binder 20, followed by curing or setting.

If used, the binder 20 may be made from an inorganic or organic material, including ceramic, polymeric, and elastomeric materials. Ceramic binders are preferred for applications requiring exposure to high temperatures, while polymeric binders are preferred for their flexibility and lightness.

However, some polymers and elastomers may be so flexible that the acoustical barrier is not sufficently stiff to perform well. Preferably, the acoustical barrier is additionally characterized by a specific stiffness of 1 to $8\times10^6$ psi/lb-in$^3$, and a flexural strength of 200 to 500 psi as measured by ASTM Standard C293-79. Such barriers will have suitable acoustical performance and also be self-supporting, making them suitable for use as structural components of enclosures.

Nonetheless, many polymeric binders are suitable, including epoxies, polyethylenes, polypropylenes, polymethylmetharylates, urethanes, cellulose acetates and polytetrafluoroethylene (PTFE).

Suitable elastomeric binders are natural rubbers and synthetic rubbers, such as the polychloroprene rubbers known by the tradename "NEOPRENE" and those based on ethylene propylene diene monomers (EPDM).

Other suitable binders are silicone compounds available from General Electric Company under the designations RTV-11 and RTV-615.

EXAMPLE I

To manufacture the acoustical barrier material, Minnesota Mining and Manufacturing Company "SCOTCHLITE" brand glass microbubbles, type C15/250, having density of about 0.15 g/cc and diameters of about 50 micron were mixed with dry powdered resin of Minnesota Mining and Manufacturing Company "SCOTCHCAST" brand epoxy, type 265, in weight ratios of resin to microbubbles of 1:1, 2:1 and 3:1. The microbubbles were not screened for the 1:1 and 3:1 mixtures, but both screened and unscreened microbubbles were used in 2:1 mixtures. The resulting powder was sifted into a wood or metal mold and cured at 170 C. for about an hour.

The cured material had a density of about 0.2 g/cc. The void characteristic diameter was about 35 micron. The air flow resistivity was $10^6$ mks rayl/meter, and porosity was about 40% by volume; each of these values is approximately that of packed quarry dust as reported in the literature. The flexural strength ranged up to 500 psi depending on resin to bubble ratio. The composite did not support a flame in horizontal sample flame tests.

To determine the suitability of the material for practicing the method of the invention, three types of acoustical characterization were performed.

First, impedance tube measurements determined the sound attenuation of the material in dB/cm. The results of these measurements are independent of sample geometry (shape, size, thickness). Three types of samples were measured and compared to 0.168 g/cc and 0.0097 g/cc "FIBERGLASS" brand spun glass thermal insulation (Baranek, Leo L., *Noise Reduction*, McGraw-Hill, New York, 1960, page 270), and also to packed quarry dust (Attenborough, K., "Acoustical Characteristics of Rigid Fibrous Absorbents and Granular Materials," *Journal of the Acoustical Society of America*, 73(3) (March 1983), page 785).

The acoustical attenuation of a sample prepared with a 1:1 weight ratio of resin to hollow microbubbles was between 0.1 and 10 dB/cm over a frequency range of 0.1 to 1 kHz, comparable to the attenuation of each of the other three materials (roughly 0.3 to 5 dB/cm).

The attenuation for a sample prepared with a 2:1 weight ratio of resin to unscreened hollow microbubbles was between 0 and 12 dB/cm over the same frequency range, while the other three materials showed attenuations of 0–3 dB/cm over the same range. For a 2:1 weight ratio using screened hollow microbubbles, the attenuation decreased somewhat in the 0.2 to 0.4 kHz range, but rapidly increased to over 14 dB at 1 kHz.

Second, insertion loss measurements according to SAE J1400 were made using panels inserted in a window between a reverberant room containing a broadband noise source and an anechoic box containing a microphone. The panel sizes were 55.2 cm square and up to 10.2 cm thick. These results are strongly dependent upon geometry.

The acoustical barrier panels comprising hollow microbubbles were about 10.2 cm thick and had mass of about 19.8 kg. By comparison, gypsum panels of 1.59 cm thickness (common in the building industry) had mass of about 16.3 kg. A lead panel had mass of 55 kg.

Over the 0.1 to 10 kHz frequency range, the panel comprising microbubbles performed somewhat better than the gypsum panel. In particular, at 160 Hz, the insertion loss through the panel comprising microbubbles was 10 dB greater than that through the lead panel, despite having only 36 percent of the mass.

As compared to theoretical performance, the panel comprising microbubbles exceeded mass law predictions except: between about 0.25 kHz and about 0.4 kHz, but by less than 10 dB throughout that range; at 0.8 kHz, but again by less than 10 dB; and from about 3 kHz to 10 kHz, but this is due to a coincidence frequency range centered about 6 kHz.

Third, insertion loss measurements were made with boxes containing a broadband noise source, using a microphone and a frequency analyzer. The roughly cube-shaped boxes ranged in size from 41 to 61 cm on a side. These results are strongly dependent upon geometry.

A box made from the acoustical barrier material comprising microbubbles and a box made from gypsum were constructed so that each had the same total mass, about 52.8 kg, despite different wall thicknesses. Thus, the box made from material comprising microbubbles had walls about 10.2 cm in thickness, and the box comprising gypsum had walls about 1.6 cm in thickness.

The attenuation by the box made from the acoustical barrier material comprising microbubbles exceeded mass law performance over the entire frequency range from 0.04 kHz to 1 kHz, and was no less than 10 dB less than mass law performance over substantially all of the frequency range of 1 kHz to 8 kHz.

Below 1 kHz and above 2 kHz, the box made from the acoustical barrier material comprising microbubbles performed generally about 10 dB better than the box made from gypsum.

Acoustical Systems

Figure 3:
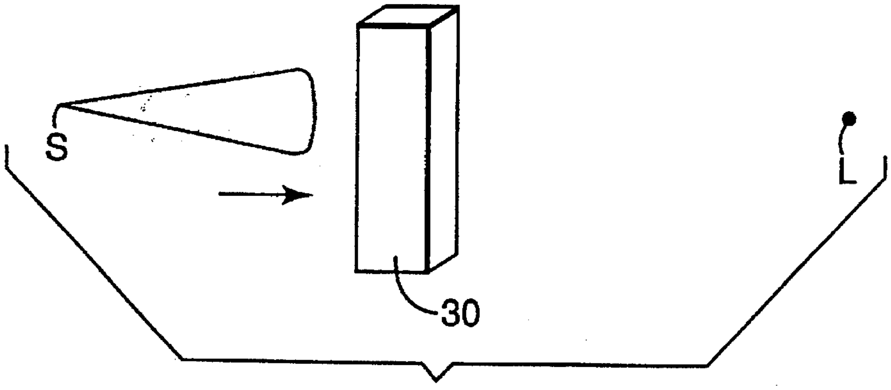
FIG. 3 is a schematic view of an acoustical system employing the invention.

As shown in FIG. 3, another aspect of the invention is an acoustical system comprising a source S of sound, shown radiating in the direction of the arrow into the acoustical barrier material 30. In a typical acoustical system, acoustical barrier material 30 is placed between the sound source S and the listener, located at point L, but for additional attenuation of sound, the acoustical barrier material substantially (or even completely) surrounds either the sound source or the ear of the listener.

Figure 4:
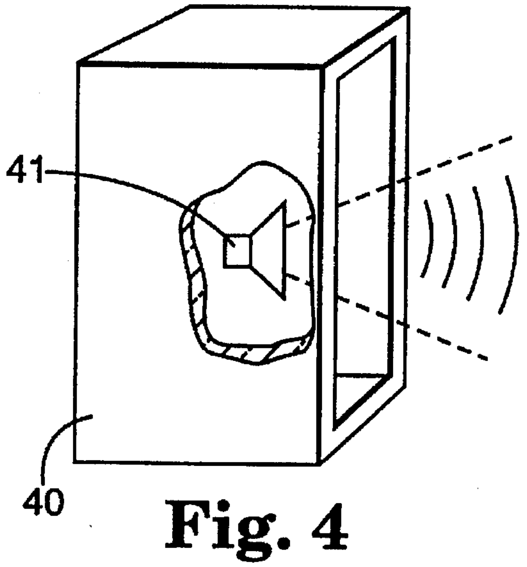
FIG. 4 is a perspective view of an embodiment of an acoustical system employing the invention.

For example, as shown in FIG. 4, an open box 40 (such as an open-faced enclosure for a loudspeaker 41) could be constructed using the acoustical barrier material.

Figure 5:
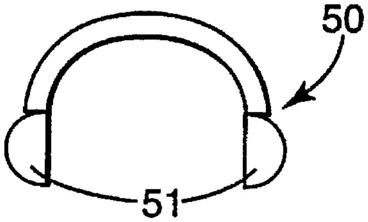
FIG. 5 is a front view of another embodiment of an acoustical system employing the invention.

As shown in FIG. 5, another application would be headphones 50 having ear enclosures 51 constructed from the barrier material, since the ear enclosures would "breathe" in a passive manner, and thus provide improved comfort for the listener.

In many applications, such a system can be acoustically sealed, relying on the porosity of the acoustical barrier material itself to allow air and moisture to escape from the enclosure directly through the barrier material, rather than through some open port that decreases the acoustical performance of the system.

Figure 6:
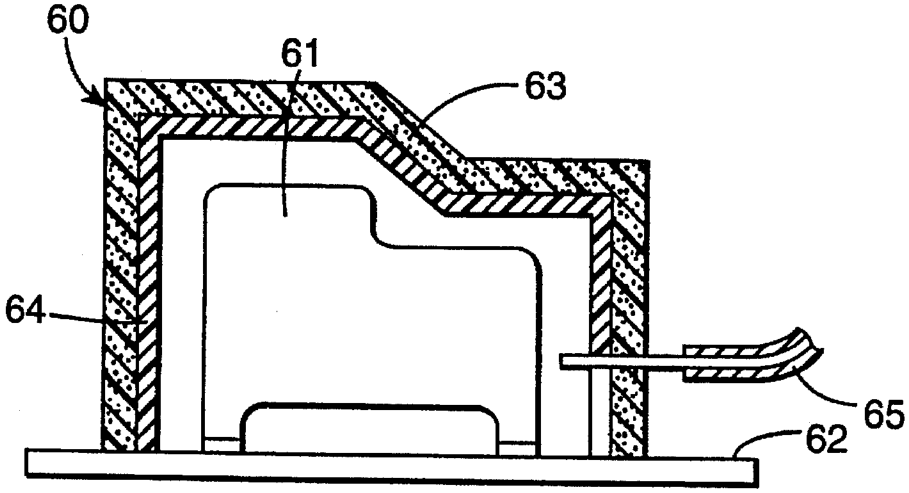
FIG. 6 is a cross-sectional side view of another embodiment of an acoustical system employing the invention.

Thus, for example, as shown in FIG. 6, a completely sealed noise reduction enclosure 60 could be provided for a piece of machinery 61 mounted on a base 62. The acoustical barrier material 63 could be lined with acoustical absorbing material 64.

In contrast to the passive ventilation of the headphone described above, active ventilation of the sealed enclosure is preferred to prevent overheating of the machinery. However, it is possible to provide adequate ventilation using only a high-pressure supply air line 65 into the enclosure 60, relying on the porosity of the acoustical barrier material 63 to provide adequate airflow outward without a separate outlet, thus eliminating a noise leakage path.

Muffler Applications

One particularly preferred acoustical system utilizes the acoustical barrier material as a muffler. In this application, the acoustical barrier material has sufficient porosity to allow gases to pass through the muffler.

We believe that the operation of the invention in this application is due at least in part to an additional physical phenomena. Specifically, it appears that in addition to attenuation of sound by the material, a conversion from turbulent to laminar flow occurs, contributing to the acoustical performance of the system as a whole.

Also, a narrow size distribution for the microbubbles, which maximizes the porosity without significantly reducing the acoustical performance, improves the overall performance of the muffler, since it must allow gas flow to be useful.

Figure 7:
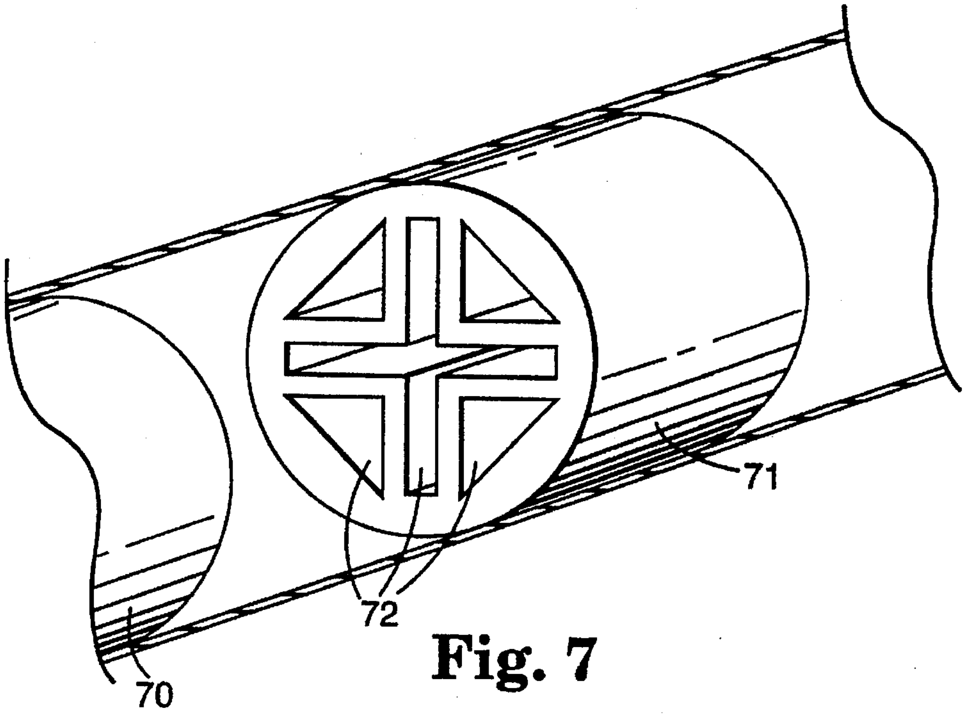
FIG. 7 is a perspective view, partially in cutaway, of an embodiment of acoustical barrier material used in the invention.

FIG. 7 shows a pipe or hose 70, such as an air line (e.g., those used with air motors), or hydrocarbon exhaust pipe (e.g., those found on small gasoline engines such as those used on lawn mowers, chain saws, weed cutters, etc.), or gas intake pipe. The muffler 71 generally fits snugly within the pipe or hose 70. Depending on the chemistry of the gases and the location of the muffler, binders or binder additives which resist chemical degradation, high temperatures, or provide increased flame retardation may be desirable.

Preferred configurations for mufflers include chambers 72 within the muffler 71 that increase the surface area exposed to the medium, thereby reducing flow resistance, and also serve as expansion chambers for the medium. Such chambers 72 can be formed by carving portions of material from a workpiece, forming a muffler by joining components with an adhesive (e.g., an epoxy), or by directly molding the muffler to include the chambers. One may also provide an end-cap-like section or face plate (not shown) to the muffler 71.

EXAMPLE II

A piece of acoustical barrier material was manufactured as described in Example I from "SCOTCHCAST" brand epoxy resin type 265 and "SCOTCHLITE" type C15/250 glass microbubbles, blended in weight ratios ranging from 2:1 to 1:1 and thermally cured to form rigid structures ranging from about 4.8 mm to 15.9 mm in thickness. Several 3.5 cm diameter cylinders of material were cut and shaped such that the cylinders fit snugly into the muffler housing of a "GAST" air motor, model number 2AM-NCC-16, which had approximately the same inner diameter as the outer diameter of the cylinder. The cylinder replaced a conventional muffler, namely two #8 mesh screens supporting between themselves a dense non-woven fiber of about 13 cm thickness.

With the cylinder in place and the air motor operating, sound level reductions ranging from 17 to 25 dBA over the conventional muffler were measured, depending on the thickness of the acoustical barrier material. Generally, the thicker samples attenuated sound better, but with a corresponding drop in air flow and thus motor speed. However, when the air line pressure was adjusted to keep the motor speed constant for the cylinders and the conventional mufflers, at least 17 dBA of attenuation was observed.

Structural Applications

It is possible to use the acoustical barrier material described above without a separate supporting assembly, i.e, as a structural component. In these applications, the acoustical barrier material is characterized by a specific stiffness of 1 to $8\times10^6$ psi/lb-in$^3$, and a flexural strength of 200 to 500 psi as measured by ASTM Standard C293-79. Large volume enclosures may be made from panels up to about 120 cm in length and width.

Figure 8:
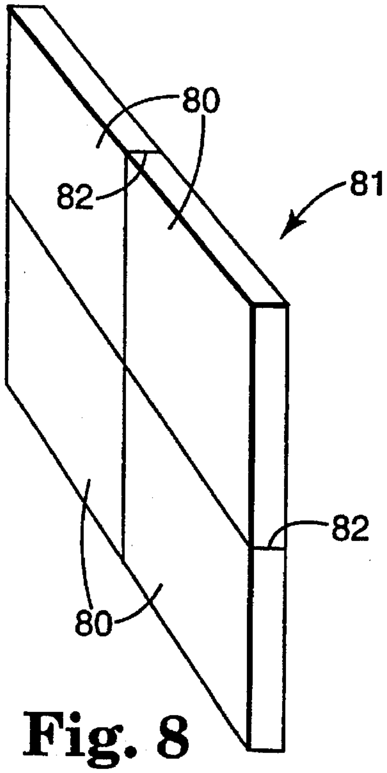
FIG. 8 is a perspective view of an embodiment of acoustical material used in the invention.

As shown in FIG. 8, when several such panels 80 are joined into a larger array 81 by simple butt joints 82, without any sealant or pressure other than the weight of the panels 80 themselves, the acoustical performance of the array 81 is not significantly decreased. We believe that the panels 80 are "self-sealing" from an acoustical standpoint, despite the prior art teaching that such arrays would transmit sound through the seams between panels.

Figure 9:
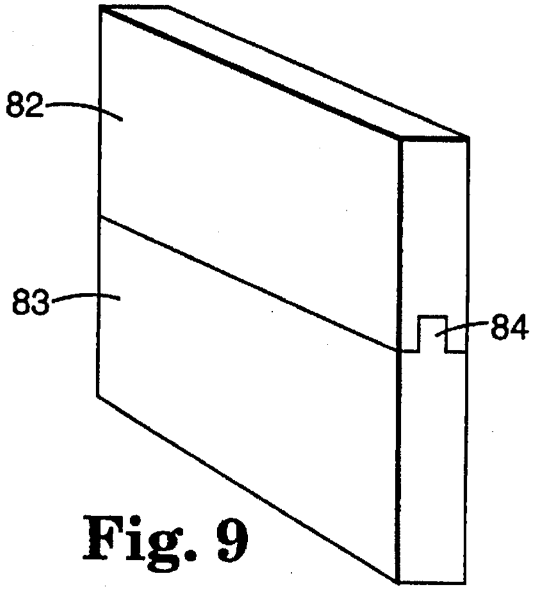
FIG. 9 is a perspective view of another embodiment of acoustical barrier material used in the invention.

Preferably, such panels are formed so that each panel has a portion of an interlocking joint, as illustrated schematically in FIG. 9 for panels 82 and 83 and joint 84. Such interlocking panels 82 and 83 are especially useful in forming acoustically sealed enclosures such as that shown in FIG. 6.

We claim:

1. A self-supporting acoustical barrier material for use within an ambient medium having a viscous skin depth, comprising microbubbles having average outer diameters of 5 to 150 microns bound together at their contact points; characterized by the microbubbles having between themselves voids which have a characteristic diameter within an order of magnitude of the viscous skin depth of the ambient medium, as calculated at 1 kHz, an air flow resistivity for the barrier material of $0.5\times10^4$ to $4\times10^7$ mks rayl/meter, and an attenuation of sound by the material comparable to mass law performance; and further characterized by a specific stiffness of $1\times10^6$ to $8\times10^6$ psi/lb-in$^3$, and a flexural strength of 200 to 500 psi as measured by ASTM Standard C293-79.

2. The self-supporting acoustical barrier material of claim 1, in the form of a panel having a portion of an interlocking joint.

3. A self-supporting acoustical barrier material, comprising microbubbles having average outer diameters of 5 to 150 microns bound together at their contact points; characterized by a porosity for the barrier material of 20 to 60 percent, an air flow resistivity for the barrier material of $0.5\times10^4$ to $4\times10^7$ mks rayl/meter, and an attenuation of sound by the material comparable to mass law performance; further characterized by a specific stiffness of $1\times10^6$ to $8\times10^6$ psi/lb-in$^3$, and a flexural strength of 200 to 500 psi as measured by ASTM Standard C293-79.

4. The self-supporting acoustical barrier material of claim 3, in the form of a panel having a portion of an interlocking joint.

5. A muffler comprising:

a porous acoustical barrier material, which allows gases to pass through, comprising microbubbles having average outer diameters of 5 to 150 microns bound together at their contact points; the barrier material characterized by a porosity of 20 to 60 percent and an air flow resistivity of $0.5\times10^4$ to $4\times10^7$ mks rayls/meter; wherein the acoustical barrier material is characterized by a specific stiffness of $1\times10^6$ to $8\times10^6$ psi/lb-in$^3$; and wherein said barrier material exhibits sound attenuation comparable to mass law performance.

6. The muffler of claim 5 wherein said microbubbles are hollow glass microbubbles.

7. The muffler of claim 6 wherein said microbubbles have average outer diameters of approximately 70 microns.

8. The muffler of claim 6 wherein said microbubbles are bound together at their contact points by a binder.

9. The muffler of claim 8 wherein said binder is selected from the group consisting of ceramic, elastomeric and polymeric materials.

10. The muffler of claim 5 wherein the muffler comprises chambers within the muffler that increase the exposed surface of acoustical barrier material.

11. The muffler of claim 5 wherein the acoustical barrier material has a flexural strength of 200 to 500 psi as measured by ASTM Standard C293-79.

12. A loudspeaker enclosure comprising:

a porous acoustical barrier material comprising microbubbles having average outer diameters of 5 to 150 microns bound together at their contact points; the barrier material characterized by a porosity of 20 to 60 percent and an air flow resistivity of $0.5\times10^4$ to $4\times10^7$ mks rayls/meter; wherein the acoustical barrier material is characterized by a specific stiffness of $1\times10^6$ to $8\times10^6$ psi/lb-in$^3$; and wherein said barrier material exhibits attenuation of sound comparable to mass law performance.

13. The loudspeaker enclosure of claim 12 wherein said microbubbles are bound together at their contact points by a binder.

14. The loudspeaker enclosure of claim 13 wherein said binder is selected from the group consisting of ceramic, elastomeric and polymeric materials.

15. The loudspeaker enclosure of claim 12 wherein the acoustical barrier material has a flexural strength of 200 to 500 psi as measured by ASTM Standard C293-79.

16. A headphone having ear enclosures, the ear enclosures comprising:

a porous acoustical barrier material comprising microbubbles having average outer diameters of 5 to 150 microns bound together at their contact points; the barrier material characterized by a porosity of 20 to 60 percent and an air flow resistivity of $0.5\times10^4$ to $4\times10^7$ mks rayls/meter; wherein the acoustical barrier material is characterized by a specific stiffness of $1\times10^6$ to $8\times10^6$ psi/lb-in$^3$; and wherein said barrier material exhibits attenuation of sound comparable to mass law performance.

17. The headphone of claim 16 wherein said microbubbles are bound together at their contact points by a binder.

18. The headphone of claim 17 wherein said binder is selected from the group consisting of ceramic, elastomeric and polymeric materials.

19. The headphone of claim 16 wherein the acoustical barrier material has a flexural strength of 200 to 500 psi as measured by ASTM Standard C293-79.

* * * * *